US012673381B2

(12) United States Patent
Göller et al.

(10) Patent No.: US 12,673,381 B2
(45) Date of Patent: Jul. 7, 2026

(54) METHOD FOR THE THERMAL PROCESSING OF A WORKPIECE WITH A THERMAL PROCESSING MACHINE

(71) Applicant: Messer Cutting Systems GmbH, Groß-Umstadt (DE)

(72) Inventors: Ingo Göller, Groß-Umstadt (DE); Hermann Gösswein, Groß-Umstadt (DE); Nils Deutsch, Groß-Umstadt (DE)

(73) Assignee: MESSER CUTTING SYSTEMS GMBH, Gross-Umstadt (DE)

( * ) Notice: Subject to any disclaimer, the term of this patent is extended or adjusted under 35 U.S.C. 154(b) by 940 days.

(21) Appl. No.: 17/852,606

(22) Filed: Jun. 29, 2022

(65) Prior Publication Data

US 2023/0001502 A1     Jan. 5, 2023

(30) Foreign Application Priority Data

Jun. 30, 2021     (DE) ..................... 10 2021 116 899.6

(51) Int. Cl.
B23K 9/12 (2006.01)
B23K 10/00 (2006.01)
(Continued)

(52) U.S. Cl.
CPC ............ B23K 9/126 (2013.01); B23K 10/006 (2013.01); B23K 26/0869 (2013.01); B23K 26/38 (2013.01)

(58) Field of Classification Search
CPC .. B23K 9/126; B23K 10/006; B23K 26/0869; B23K 26/38
(Continued)

(56) References Cited

U.S. PATENT DOCUMENTS 4,328,411 A * 5/1982 Haller .................. H02K 15/026
225/2
4,613,269 A * 9/1986 Wilder ...................... G06T 7/11
414/730
(Continued)

FOREIGN PATENT DOCUMENTS

DE          10332422 A1     2/2005
DE     102014101719 A1     8/2015
(Continued)

OTHER PUBLICATIONS

Search Report issued Jan. 26, 2022 in DE Application No. 10 2021 116 899.6.

*Primary Examiner* — Jimmy Chou
(74) *Attorney, Agent, or Firm* — Panitch Schwarze Belisario & Nadel LLP

(57) ABSTRACT

A method for thermal processing of a workpiece uses a thermal processing machine. The method includes the following steps carried out in an automated manner: setting up the processing machine by producing contact between the processing tool and the workpiece and recording the spatial position of a workpiece surface, positioning the processing tool at a predetermined first and second distance from the workpiece surface and recording the associated signal values of the distance sensor as first and second measured values, and calibrating the distance controller which includes determining a height derivative of the distance sensor signal and an amplification factor for the signal of the distance sensor taking in account the first measured value, the second measured value, the first distance and the second distance; positioning the processing tool at a predetermined working distance from the workpiece surface with the inclusion of the amplification factor; and thermally processing the workpiece.

17 Claims, 3 Drawing Sheets

Figure 1:
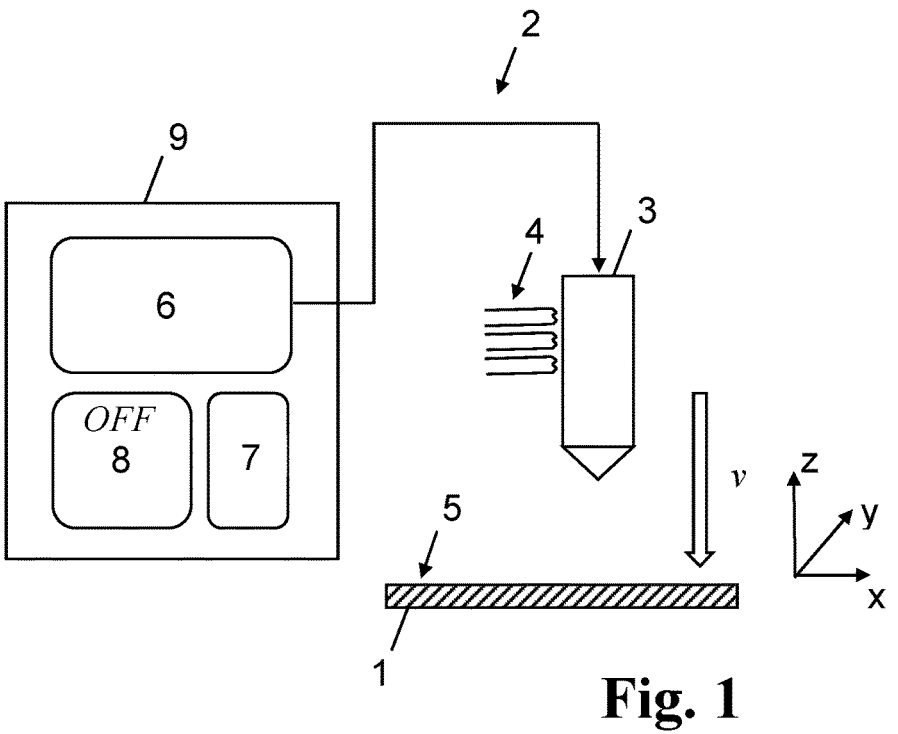

(51) Int. Cl.
 B23K 26/08 (2014.01)
 B23K 26/38 (2014.01)
(58) Field of Classification Search
 USPC .................................................. 219/121.54
 See application file for complete search history.

(56) References Cited

U.S. PATENT DOCUMENTS

| | | | | |
|---|---|---|---|---|
| 4,618,938 A * | 10/1986 | Sandland | ................ | G06T 7/001 |
| | | | | 382/148 |
| 4,667,113 A * | 5/1987 | Nakajima | ............. | G06T 7/0006 |
| | | | | 250/559.08 |
| 4,794,222 A * | 12/1988 | Funayama | ........... | B23K 26/048 |
| | | | | 219/121.79 |
| 5,067,086 A * | 11/1991 | Yamazaki | ............ | B23K 26/046 |
| | | | | 219/121.79 |
| 5,304,773 A * | 4/1994 | Kilian | ................ | B23K 26/0853 |
| | | | | 219/121.78 |
| 5,387,061 A * | 2/1995 | Barkman | ............... | B23Q 17/24 |
| | | | | 409/80 |
| 5,489,758 A * | 2/1996 | Nihei | ................. | B23K 26/0884 |
| | | | | 901/42 |
| 5,624,588 A * | 4/1997 | Terawaki | ............. | B23K 9/1272 |
| | | | | 901/42 |
| 5,751,584 A * | 5/1998 | Yuasa | ................ | G05B 19/4068 |
| | | | | 700/174 |
| 5,837,960 A * | 11/1998 | Lewis | .................. | B23K 26/144 |
| | | | | 219/121.64 |
| 5,864,114 A * | 1/1999 | Fukuda | ................ | B23K 26/032 |
| | | | | 219/121.69 |
| 5,939,017 A * | 8/1999 | Walcott | .............. | B23K 37/0241 |
| | | | | 266/78 |
| 6,008,465 A * | 12/1999 | Horn | .................... | B23K 26/123 |
| | | | | 219/121.72 |
| 6,084,223 A * | 7/2000 | Dietz | .................. | B23K 26/032 |
| | | | | 219/121.64 |
| 6,128,546 A * | 10/2000 | Basista | ............. | G05B 19/4205 |
| | | | | 700/173 |
| 6,353,203 B1 * | 3/2002 | Hokodate | ........... | B23K 26/032 |
| | | | | 219/121.75 |
| 6,430,472 B1 * | 8/2002 | Boillot | ................ | G05B 19/056 |
| | | | | 901/41 |
| 6,563,130 B2 * | 5/2003 | Dworkowski | .......... | G01S 17/46 |
| | | | | 702/158 |
| 6,603,136 B1 * | 8/2003 | Wagner | .................. | B23K 26/04 |
| | | | | 250/221 |
| 6,617,541 B1 * | 9/2003 | Wadman | ................ | H05K 3/027 |
| | | | | 349/139 |
| 6,622,058 B1 * | 9/2003 | Picard | .................... | B23K 10/00 |
| | | | | 700/174 |
| 6,632,053 B2 * | 10/2003 | Koch | ................. | G05B 19/4099 |
| | | | | 700/193 |
| 6,710,294 B2 * | 3/2004 | Lawson | .............. | B23K 26/142 |
| | | | | 219/121.84 |
| 6,772,040 B1 * | 8/2004 | Picard | ................. | B23K 10/006 |
| | | | | 700/165 |
| 6,903,300 B2 | 6/2005 | Faust et al. | | |
| 6,974,930 B2 * | 12/2005 | Jense | ................... | B23K 26/082 |
| | | | | 359/201.1 |
| 7,005,606 B2 * | 2/2006 | Legge | .................... | B23K 26/04 |
| | | | | 219/121.82 |
| 7,038,165 B2 * | 5/2006 | Okuda | .............. | B23K 26/0884 |
| | | | | 219/121.78 |
| 7,062,351 B2 * | 6/2006 | Wampler | ........... | G05B 19/4069 |
| | | | | 700/178 |
| 7,283,892 B1 * | 10/2007 | Boillot | .................. | G01S 17/46 |
| | | | | 901/41 |
| 7,638,731 B2 * | 12/2009 | Kosmowski | ......... | B23K 26/043 |
| | | | | 219/121.68 |
| 7,764,039 B2 * | 7/2010 | Yamaguchi | ........ | G05B 19/4061 |
| | | | | 318/560 |
| 8,175,858 B2 * | 5/2012 | Naganawa | ......... | G05B 19/4069 |
| | | | | 703/7 |
| 8,367,969 B2 * | 2/2013 | Caristan | ................ | B23K 26/38 |
| | | | | 219/121.72 |
| 8,581,144 B2 * | 11/2013 | Furuta | .................. | B23K 26/046 |
| | | | | 219/121.75 |
| 8,987,634 B2 * | 3/2015 | Pieger | ................... | B23K 31/12 |
| | | | | 219/121.84 |
| 9,073,142 B2 * | 7/2015 | Phillip | .................. | B23K 26/38 |
| 9,110,459 B2 * | 8/2015 | Matsumoto | .......... | B23Q 39/027 |
| 9,122,267 B2 * | 9/2015 | Morita | ................... | G06T 7/564 |
| 10,507,558 B2 * | 12/2019 | Inaba | ................ | B23Q 17/2409 |
| 11,396,057 B2 * | 7/2022 | Boillot | .................. | G01S 17/86 |
| 11,583,951 B2 * | 2/2023 | Fahrni | .................... | B23K 26/08 |
| 2003/0192865 A1 * | 10/2003 | Cole, III | .............. | B23K 26/211 |
| | | | | 700/166 |
| 2003/0209528 A1 * | 11/2003 | Choo | ....................... | B28D 5/00 |
| | | | | 219/121.72 |
| 2004/0206735 A1 * | 10/2004 | Okuda | ................... | B23K 26/04 |
| | | | | 219/121.78 |
| 2005/0010324 A1 * | 1/2005 | Kaever | ............. | G05B 19/4061 |
| | | | | 700/178 |
| 2005/0226377 A1 * | 10/2005 | Wong | ................. | G05B 19/4061 |
| | | | | 378/65 |
| 2006/0081575 A1 * | 4/2006 | Egawa | ................. | B23K 26/382 |
| | | | | 219/121.84 |
| 2007/0075054 A1 * | 4/2007 | Nakamura | ............. | B23K 26/04 |
| | | | | 219/121.61 |
| 2007/0084837 A1 * | 4/2007 | Kosmowski | ......... | B23K 26/043 |
| | | | | 219/121.68 |
| 2007/0228025 A1 * | 10/2007 | Horn | .................. | B23K 26/1476 |
| | | | | 219/121.84 |
| 2007/0241083 A1 * | 10/2007 | Yamaguchi | ........ | B23K 26/0876 |
| | | | | 219/121.59 |
| 2009/0127762 A1 * | 5/2009 | Kilian | ................ | B23K 37/0408 |
| | | | | 269/296 |
| 2009/0250445 A1 * | 10/2009 | Yamaguchi | .......... | G05B 19/404 |
| | | | | 219/121.72 |
| 2009/0312862 A1 * | 12/2009 | Fagan | .................... | B23K 26/38 |
| | | | | 700/192 |
| 2010/0133243 A1 * | 6/2010 | Nomaru | ............... | B23K 26/032 |
| | | | | 219/121.67 |
| 2010/0176099 A1 * | 7/2010 | Hilderbrand | ......... | G05B 19/401 |
| | | | | 340/686.1 |
| 2011/0089956 A1 * | 4/2011 | Hermann | ............... | B23K 26/03 |
| | | | | 324/686 |
| 2011/0100967 A1 * | 5/2011 | Yoo | ........................ | G01N 27/00 |
| | | | | 219/121.73 |
| 2011/0210109 A1 * | 9/2011 | Szelagowski | .......... | B23K 26/38 |
| | | | | 219/121.72 |
| 2011/0278268 A1 * | 11/2011 | Siman-Tov | .............. | B41C 1/02 |
| | | | | 219/121.69 |
| 2011/0313561 A1 * | 12/2011 | Lee | ....................... | G06T 7/0004 |
| | | | | 700/166 |
| 2012/0111839 A1 * | 5/2012 | Grassi | ................ | B23K 26/0884 |
| | | | | 219/121.81 |
| 2012/0267349 A1 * | 10/2012 | Berndl | ................... | B23K 26/046 |
| | | | | 219/121.65 |
| 2013/0200052 A1 * | 8/2013 | Wittwer | ............. | B23K 26/1462 |
| | | | | 219/121.75 |
| 2013/0256285 A1 * | 10/2013 | Baxter | ................. | B23K 26/048 |
| | | | | 219/121.72 |
| 2014/0103019 A1 * | 4/2014 | Galvagnini | .......... | B23K 26/702 |
| | | | | 219/121.85 |
| 2014/0116997 A1 * | 5/2014 | Inoue | .................... | B23K 26/38 |
| | | | | 219/121.67 |
| 2014/0138363 A1 * | 5/2014 | Hammann | ............. | B23K 26/04 |
| | | | | 219/121.78 |
| 2014/0263211 A1 * | 9/2014 | Hassan | ............. | B23K 26/361 |
| | | | | 219/121.81 |
| 2015/0028007 A1 * | 1/2015 | Pluss | ...................... | B23K 26/40 |
| | | | | 219/121.68 |
| 2015/0151381 A1 * | 6/2015 | Kurosawa | ......... | B23K 26/1464 |
| | | | | 219/121.83 |
| 2015/0239059 A1 * | 8/2015 | Myers | ................. | B23K 26/702 |
| | | | | 219/121.44 |

(56) References Cited

U.S. PATENT DOCUMENTS

| | | | | |
|---|---|---|---|---|
| 2015/0241868 A1* | 8/2015 | Matsumoto | B23K 26/0892 | 700/114 |
| 2015/0266133 A1* | 9/2015 | Tokito | B23K 26/083 | 219/121.6 |
| 2015/0273626 A1* | 10/2015 | Tokito | B23K 26/043 | 219/121.6 |
| 2015/0352679 A1* | 12/2015 | Yamamoto | B23Q 17/00 | 73/865.8 |
| 2016/0059347 A1* | 3/2016 | Kogel-Hollacher | B23K 26/082 | 219/121.73 |
| 2016/0059350 A1* | 3/2016 | Schoenleber | B23K 26/04 | 219/121.81 |
| 2016/0059351 A1* | 3/2016 | Miyashita | B23K 26/048 | 219/121.81 |
| 2016/0096239 A1* | 4/2016 | Raichle | B23K 26/1436 | 219/74 |
| 2016/0114434 A1* | 4/2016 | Regaard | B23K 26/046 | 219/121.81 |
| 2016/0158884 A1* | 6/2016 | Hagenlocher | B23K 26/042 | 219/121.85 |
| 2016/0184923 A1* | 6/2016 | Tokito | B23K 26/048 | 219/121.81 |
| 2016/0193692 A1* | 7/2016 | Regaard | B23K 31/125 | 219/121.62 |
| 2017/0057003 A1 | 3/2017 | Giezewski | | |
| 2017/0157702 A1* | 6/2017 | Takada | B23K 26/03 | |
| 2017/0232558 A1* | 8/2017 | Kano | B23K 26/382 | 219/121.72 |
| 2017/0236738 A1* | 8/2017 | Van Lieshout | B23K 26/364 | 425/174 |
| 2017/0334019 A1* | 11/2017 | Izumi | B23K 26/032 | |
| 2018/0076060 A1* | 3/2018 | Oh | H01L 21/68757 | |
| 2018/0277435 A1* | 9/2018 | Fujita | B23K 26/53 | |
| 2018/0370058 A1* | 12/2018 | Fukada | B26D 7/1863 | |
| 2019/0015931 A1* | 1/2019 | Kogel-Hollacher | B23K 26/34 | |
| 2019/0074221 A1* | 3/2019 | Nomaru | B23K 26/352 | |
| 2019/0128857 A1* | 5/2019 | Hiramatsu | G01N 30/24 | |
| 2019/0247960 A1* | 8/2019 | Mienhardt | G01N 21/8851 | |
| 2020/0041249 A1* | 2/2020 | Strebel | B23K 26/032 | |
| 2020/0047274 A1* | 2/2020 | Tani | G01B 11/14 | |
| 2021/0245295 A1* | 8/2021 | Fahrni | G05B 19/4068 | |
| 2021/0308799 A1* | 10/2021 | Funaoka | B23K 26/1464 | |
| 2021/0402521 A1* | 12/2021 | Lin | B23K 26/361 | |
| 2022/0143749 A1* | 5/2022 | Nogi | B23K 31/10 | |
| 2022/0314370 A1* | 10/2022 | Mach | B23K 26/70 | |
| 2023/0054278 A1* | 2/2023 | Sepp | B23K 31/10 | |
| 2023/0166354 A1* | 6/2023 | Setoguchi | G01N 21/95 | 219/121.67 |
| 2023/0398637 A1* | 12/2023 | Kikkawa | B23K 37/0235 | |

FOREIGN PATENT DOCUMENTS

| | | | |
|---|---|---|---|
| EP | 1498209 A2 | 1/2005 | |
| EP | 1784281 B1 | 3/2008 | |
| EP | 2546598 B1 | 11/2019 | |

* cited by examiner

METHOD FOR THE THERMAL PROCESSING OF A WORKPIECE WITH A THERMAL PROCESSING MACHINE

CROSS-REFERENCE TO RELATED APPLICATIONS

This application claims priority under 35 U.S.C. § 119(b) to German Application No. 10 2021 116 899.6, filed Jun. 30, 2021, the disclosure of which is incorporated herein by reference in its entirety.

TECHNICAL FIELD

The present invention relates to a method for the thermal processing of a workpiece with a thermal processing machine which has a processing tool, which is displaceable relative to the workpiece by means of a CNC controller and, for fine tuning, by means of a distance controller, and a distance sensor which is displaceable with the processing tool.

The method according to the invention can be used in particular for the thermal processing of a metal workpiece, preferably a ferromagnetic workpiece. The expression "thermal processing" includes welding, cutting or marking of the workpiece. Thermal welding methods are, for example, gas fusion welding, arc welding, gas-shielded welding, electron beam welding and laser welding. The thermal cutting methods include, for example, plasma arc cutting, autogenous flame cutting and laser cutting.

A "thermal processing machine" is designed for the thermal processing of a workpiece. The expression includes cutting and welding machines. A thermal processing machine has a "processing tool" for the thermal processing of the workpiece. Processing tools in this context are, for example, the focusing optics of a laser cutting or laser welding machine, but also plasma or autogenous welding or cutting torches. The processing tool is displaceable in a predefined space in a computer-assisted manner by means of a machine controller—also referred to in the following text as a "CNC controller"—and can be positioned in that space fully automatically. Preferably, the position of the processing tool is recorded by the CNC controller using an encoder, with which the actual values of the position coordinates of the processing tool can be recorded. The CNC controller then determines and corrects deviations of the actual position of the processing tool relative to its desired position.

A "distance controller" within the meaning of the invention is a controller of the position of the processing tool for the purpose of setting the distance of the processing tool from a workpiece surface as precisely as possible to a predetermined distance value. A spatial position of the processing tool in the xyz-direction predetermined by the CNC controller can thereby be defined more precisely in terms of the setting of a predetermined distance in the z-direction. In particular, it is thus possible to move the processing tool at a distance relative to the workpiece surface that is as constant as possible.

Such a distance controller requires a distance sensor with which the actual position of the processing tool relative to the workpiece surface can be determined. The expression "distance sensor" refers to a sensor whose measurement signal correlates or can be correlated with the distance of the processing tool from the workpiece.

PRIOR ART

Known methods for the thermal processing of a workpiece can be optimised both in terms of the desired processing result, that is to say the processing quality, and in terms of the processing time required therefor. In principle, however, as consistently high a processing quality as possible with as short a processing time as possible is desirable.

In particular the maintenance with maximum precision of a previously determined (optimised) working distance between the processing tool and the workpiece has a substantial impact on the processing result. For this purpose, known thermal processing machines routinely have a distance controller via which the distance between the processing tool and the workpiece can be adjusted to the working distance. Various distance controllers are known, which work inductively, optically or capacitively, for example.

Thus, EP 1 498 209 A2, for example, describes an inductive distance controller. This distance controller is based on the generation of a magnetic field in the region of the torch head by means of a field coil surrounding the torch head and recording of the magnetic field using at least two measuring elements, which likewise surround the torch head and generate a measurement signal in the form of an alternating electrical field. For adjusting the working distance, the phase position of the measurement signals of the two measuring elements is evaluated.

However, exact process management is achievable with a distance controller only if the processing machine is set up and calibrated correctly. Setting up of the processing machine is generally carried out manually and is therefore time-, labour- and cost-intensive.

Setting up of the processing machine often comprises a plurality of process steps, in particular "initial value finding" and calibration of the distance controller. In "initial value finding", the processing tool is manually moved in the direction towards the workpiece surface and positioned such that the processing tool is brought into contact with the surface of the workpiece to be processed. In this manner, the spatial position of a point of the workpiece surface is determined. The point so determined is the starting point for the positioning of the processing tool relative to the workpiece surface. A suitable method for "initial value finding" is described in DE 10 2014 101 719 A1, for example.

For calibration of the distance controller, the vertical position of the processing tool above the workpiece is set with an underlay tool. A suitable underlay tool is, for example, a wedge with steps of known step height, with which different distances between the processing tool and the workpiece can be set. After fine tuning by hand, a reference variable for the distance controller is determined. Since the calibration can be prone to error or ambient parameters which are relevant for the result can change over time, it is necessary to regularly check that the distance controller is functioning properly, during which it is tested whether the underlay tool fits snugly between the processing tool and the workpiece even after the distance has been set with the distance controller. A further fine tuning may be necessary. If a processing machine has a plurality of processing tools, the above-described set-up steps must be carried out separately for each processing tool. A disadvantage is found to be the high outlay in terms of time and labour for manual calibration, which, owing to the associated process interruptions and stoppage times, is also cost-intensive.

TECHNICAL OBJECT

Accordingly, the object underlying the present invention is to provide a method which permits thermal processing of a workpiece with a quality that is as high and consistent as possible and which can nevertheless be carried out easily, quickly and inexpensively.

SUMMARY OF THE INVENTION

This object is achieved by a method for the thermal processing of a workpiece with a thermal processing machine having the features of patent claim 1.

The present invention is based on the idea of simplifying the thermal processing of a workpiece and reducing process stoppage times by carrying out the method steps from setting up of the processing machine to thermal processing of the workpiece in a fully automated manner. A basis therefor is the CNC controller of the processing machine, which is used according to the invention both for initial value finding and for calibration of the distance controller. The CNC controller is already present and has the advantage that it can be calibrated in advance, that is to say independently of the workpiece. Once the CNC controller has been calibrated, it can therefore be used for a plurality of workpieces. By means of the CNC controller calibrated in advance, the processing tool can be positioned with high precision in a predetermined space, that is to say in the x-, y- and z-direction.

The setting up of the processing machine begins according to the invention with automated "initial value finding", in which the processing tool is carefully moved in the direction towards the workpiece surface by means of the CNC controller, namely until the processing tool touches the workpiece surface. The calibrated CNC controller of the processing machine is used for moving the processing tool. In most cases, the position of the workpiece in the space and thus the direction of movement (for example in the z-direction) of the working tool during the initial value finding should already be defined, at least roughly, by the arrangement of the workpiece relative to the processing machine, that is to say by the processing machine itself, for example by means of a support surface provided for the workpiece or another boundary surface of the processing machine. Otherwise, it is, however, also conceivable for the direction of movement to be defined by the operator. The movement of the processing tool takes place with a speed at which neither the processing tool nor the workpiece can be damaged by the mutual contact. Preferably, contact between the processing tool and the workpiece is produced by careful lowering of the processing tool by means of the CNC controller. Preferably, contact between the processing tool and the workpiece is identified by the fact that an electric circuit is closed by the contact. As soon as contact is identified, the movement of the processing tool in the direction towards the workpiece surface is stopped in a fully automated manner in order to prevent damage to the processing tool, but also to the workpiece. In this manner, the spatial position of a first point of the workpiece surface is determined. The point so determined is the starting point for the subsequent positioning of the processing tool relative to the workpiece surface.

The distance sensor signal is generally dependent on a large number of factors, of which there may be mentioned here only by way of example the material of which the workpiece is made, the workpiece geometry, in particular the thickness of the workpiece, but also the ambient conditions, such as the temperature. An exact distance determination using the distance sensor requires the distance sensor to be height calibrated. In a second method step it is therefore provided according to the invention that the processing tool is positioned at a predetermined first distance from the workpiece surface and the associated signal value of the distance sensor is recorded as a first measured value. For positioning, the processing tool is moved by means of the CNC controller preferably perpendicular to the workpiece surface, that is to say parallel to the surface normal of the workpiece surface. This corresponds to a movement in the z-direction, if the workpiece surface extends in the x- and y-direction. Then the processing tool is positioned by means of the CNC controller at least at a second distance from the workpiece surface which is different from the first distance, and the associated signal value of the distance sensor is recorded as a second signal value.

For calibration of the distance controller, a height derivative of the distance sensor signal is then determined on the basis of the recorded signal values. In the simplest case, the determination of the height derivative is carried out on the basis of two measurement points, wherein the first measurement point is formed from the first distance and the first measured value, and the second measurement point is formed from the second distance and the second measured value. In this case, the height derivative corresponds to the gradient of a straight line through the first and second measurement points.

Distance sensors regularly have a predetermined measurement range. The definition of the measurement range depends on what demands are made of the precision of the distance sensor. It has proved expedient if measurement deviations of the distance sensor of not more than 5%, preferably not more than 1%, are allowed. In the measurement range, the measurement deviations (measurement errors) of the distance sensor remain within the predetermined limits. However, the predetermined measurement range in the specific application can be matched more or less well to the signal values actually measured depending on the prevailing process conditions (temperature, atmosphere, pressure, material properties). The precision of the distance controller is helped, however, if the measurement range of the distance sensor is exhausted. In particular small distances between the processing tool and the workpiece, for example, in the range of from 2 to 15 mm should lead to a signal value which lies within the optimal measurement range of the distance sensor. Only thus can the processing tool be positioned and moved precisely in the close vicinity of the workpiece. In most cases, this can only be achieved by amplifying the distance sensor signal. According to the invention, it is therefore provided that an amplification factor for the distance sensor signal is determined on the basis of the first measured value, the second measured value, the first distance and the second distance. The amplification factor can be determined, for example, in that, on the basis of a calibration curve determined by the first measured value and the second measured value, the first distance and the second distance, the amplification of the distance sensor signal is analysed and finally changed in order to set a corresponding gradient and thus optimise the response to disturbance variables. Ideally, the amplification factor corresponds to the amplification at which the signal value of the distance sensor associated with the working distance is in the range of from $-0.25$ V to $0.25$ V. The amplification factor can be greater than or less than 1, or it is 1 if amplification of the distance sensor signal is not required.

Advantageously, the signal of the distance sensor is amplified with the amplification factor in the thermal processing of the workpiece according to method step (c). However, this requires the amplification factor to be taken into account in the calibration of the distance controller, in particular in the determination of the height derivative of the distance sensor signal.

Thereafter, the processing tool is positioned at a predetermined working distance from the workpiece surface. Positioning takes place by means of the calibrated distance controller with the inclusion of the amplification factor. Finally, the actual thermal processing of the workpiece is carried out. In the thermal processing of the workpiece, either only the distance controller is used, or there is cooperation between the distance controller and the CNC controller. In the simplest case, in the thermal processing of the workpiece according to method step (c), the distance of the processing tool from the workpiece surface is maintained at the working distance by the distance controller, wherein the control variable is the amplified signal of the distance sensor. Preferably, the reference measured value multiplied by the amplification factor is used as the reference variable for the distance controller. Advantageously, the distance controller corrects a path of movement for the processing tool predetermined by the CNC controller. This is because deviations in the workpiece geometry or in the position of the workpiece can be identified precisely by the distance controller. As a result, it is ensured that the working distance is maintained. This contributes to a good and precise processing result. At the same time, stoppage times are reduced by the fully automated sequence of the method steps.

The method according to the invention is found to be particularly advantageous in the case of large raw material sheets with a length and/or a width of, for example, more than 100 cm. This is because measurement errors in the point-wise initial value finding have more of an impact the further the processing tool is to be positioned from the spatial position, recorded according to method step (aa), of the first point on the workpiece surface, or in the case of long process times, during which the ambient parameters relevant for the distance controller, in particular the air humidity and the temperature, can change significantly. This problem occurs especially when the workpiece to be processed is to be thermally processed not in one stroke but multiple times at separate locations on the workpiece surface which are spaced apart from one another, for example because a plurality of moulded bodies are to be produced from the same workpiece or because a plurality of weld seams which are spatially spaced apart from one another must be produced. In such cases, it is possible to carry out method steps (aa) to (dd) according to the invention before the processing tool is positioned relative to the same workpiece a second time and to carry out a second thermal processing of the same workpiece again according to method steps (b) and (c). Because method steps (a) to (c) are carried out in an automated manner according to the invention, the associated loss of time is small. On the other hand, however, such a procedure contributes to a particularly high processing quality.

In a preferred embodiment of the method according to the invention, setting up the processing machine according to method step (a) comprises positioning the processing tool at the working distance from the workpiece surface and recording the associated signal value of the distance sensor as the reference measured value for the distance controller.

With regard to the subsequent thermal processing of the workpiece, in which the processing tool is positioned or moved at a predetermined working distance from the workpiece surface, precise calibration of the distance controller in the region of the working distance is desirable. It has therefore proved expedient to position the processing tool at the later working distance from the workpiece surface when setting up the processing machine and to record the corresponding signal value of the distance sensor. On the one hand, the signal value so recorded—optionally after being multiplied by the amplification factor—can be taken into account in the calibration of the distance controller according to method step (dd). On the other hand, it can be used—optionally after being multiplied by the amplification factor—directly as the reference variable for the distance controller. The measured value recorded at the working distance from the workpiece surface is therefore also referred to here as the reference measured value for the distance controller. In the simplest case, the first distance or the second distance is the working distance.

It has proved expedient if the signal value recorded on production of the contact between the processing tool and the workpiece according to method step (aa) is a reference value which is taken into account in the calibration of the distance controller, in particular in the determination of the amplification factor, according to method step (dd).

If the signal values of typical distance sensors are entered into a coordinate system in dependence on the distance, either a signal curve that rises with the distance of the processing tool from the workpiece or a falling signal curve is found. The signal value recorded on production of the contact between the processing tool and the workpiece corresponds to the point of intersection of the signal curve with the ordinate of the coordinate system. The position of this point of intersection depends on a plurality of factors, for example the workpiece geometry or the nature of the workpiece; it is at most of secondary importance in the calibration of the distance controller according to method step (dd). It plays no part at all in the determination of the height derivative. The calibration of the distance controller, in particular the determination of the amplification factor, can be simplified if the signal value recorded on production of the contact between the processing tool and the workpiece is taken into account as the reference value in the calibration according to method step (dd), for example by being subtracted from the first measured value, from the second measured value and from any further measured values.

In an advantageous embodiment of the method according to the invention, a safety distance for the rapid positioning of the processing tool is calculated on the basis of the contact produced between the processing tool and the workpiece according to method step (aa). Advantageously, the determination of a safety distance from the workpiece surface for the rapid positioning of the processing tool is carried out taking into account the contact between the processing tool and the workpiece produced according to method step (aa) and the predetermined working distance $h_{cut}$ from the workpiece surface.

As well as having a CNC controller, the thermal processing machine has a distance controller via which the processing tool is displaceable relative to the workpiece. While the distance controller is designed for the slow fine tuning of the position of the processing tool relative to the workpiece, rapid positioning of the processing tool is possible by means of the CNC controller. In order to keep the processing time as short as possible—in particular where the same workpiece is thermally processed multiple times in succession—it has proved expedient to divide the space in which the processing tool can be displaced for the processing into two sub-spaces located one above the other, namely a first, upper sub-space, in which the processing tool is at such a large distance from the workpiece that rapid positioning of the processing tool is possible with the CNC controller alone, and a second, lower sub-space, in which, owing to the proximity thereof to the workpiece and the associated risk of collision, only slow positioning of the processing tool by means of the distance controller is possible. The first sub-space should be as large as possible, in view of short process times, but the second sub-space should not be so small that there is a risk of collision.

A boundary between the two sub-spaces can be determined by applying a safety distance to the position of the workpiece surface. From the spatial position of the workpiece surface recorded according to method step (aa) it is possible, by applying the safety distance, to calculate a plane which divides the space above the workpiece surface into a sub-space facing the workpiece and a sub-space facing away from the workpiece. This plane corresponds to the safety distance to be maintained. Free and rapid positioning of the processing tool solely via the CNC controller of the processing machine is provided only within the upper sub-space facing away from the workpiece. The distance between the uppermost position of the z-axis to the boundary of the two sub-spaces is travelled at maximum speed in the process. It is referred to here as the "distance for rapid positioning". In the case of thermal cutting of a workpiece with a processing tool (e.g. plasma torch or laser), the safety distance is preferably composed of the pierce height and a safety margin. The pierce height is the distance of the processing tool from the workpiece surface at which the thermal processing of the workpiece according to method step (c) is begun by starting the processing tool. The pierce height is advantageously in the range of from 165% to 185%, based on the working distance. The safety margin is preferably from 20 mm to 50 mm.

Advantageously, in order to record the spatial position of the workpiece surface according to method step (aa), a second contact between the processing tool and the workpiece is produced and the spatial position of a second point on the workpiece surface is recorded.

It has, however, proved particularly expedient if, for recording the spatial position of the workpiece surface according to method step (aa), two further contacts between the processing tool and the workpiece are produced at points on the workpiece surface which are spaced apart from one another.

If maintenance of the working distance by the distance controller is ensured, it is sufficient for the thermal processing of a workpiece in the simplest case to record the spatial position of a single point on the workpiece surface as the starting point for the distance controller. However, it is frequently the case that the processing tool is to carry out thermal processing of the same workpiece multiple times, wherein it must start at different points on the workpiece surface. By determining a further contact point, or two further contact points spaced apart from one another, between the processing tool and the workpiece, the position of the workpiece surface in the space can be recorded with high precision in the case of a flat workpiece surface. As a result, it is possible at a further starting point for the thermal processing to dispense with the production of contact between the processing tool according to method step (aa).

Preferably, the distance sensor detects the electrical capacitance between a measuring electrode of the distance sensor and the workpiece. A capacitive distance sensor has the advantage of good measuring accuracy while at the same time having a small overall size. It is additionally inexpensive.

Alternatively, the distance sensor can, however, also detect the distance between the workpiece and the processing tool by an optical method. Optical distance sensors—unlike capacitive distance sensors—exhibit high measuring accuracy even in the case of workpieces with surface damage or rust adhering thereto.

In the simplest case, contact between the processing tool and the workpiece can be identified by the fact that an electric circuit is closed by the contact. Alternatively, contact between the processing tool and the workpiece can, however, also be identified from the feedback of a drive amplifier (torque, current, etc.) or of a mechanical lever on-off switch. This is found to be advantageous in terms of the required installation space, since an additional sensor on the processing tool or an electrically conducting design of at least parts of the processing tool can thus be dispensed with. Alternatively, contact between the processing tool and the workpiece can, however, also be identified in a space-saving manner with the aid of the sensor signal and a default parameterisation of the closed-loop control circuit.

Advantageously, the positioning of the processing tool according to method step (bb) and/or (cc) is carried out on the basis of a processing machine coordinate system, the zero point of which is a contact point produced on production of the contact between the processing tool and the workpiece according to method step (aa).

The displacement of the processing tool relative to the workpiece requires a processing machine coordinate system. In this case, the zero point of the processing machine coordinate system can in principle be any desired point. However, it has been found to be advantageous to carry out a zero shift after the contact has been produced according to method step (aa), so that a contact point produced on production of the contact according to method step (aa) forms the zero point of the processing machine coordinate system. The advantage of a zero shift is that the calculations necessary for moving the processing tool relative to the workpiece are simplified. Since, on production of the contact, the processing tool and the workpiece generally touch one another not merely at a single point but rather with a contact area, it has proved expedient to select a specific point of the contact surface which is to form the zero point. Preferably, the zero point corresponds to the mid-point of the contact area. This can be, for example, the mid-point of a nozzle, the so-called nozzle tip, or the point on the workpiece surface through which the optical axis of a laser optics runs. Preferably, positioning of the processing tool according to method steps (bb) and (cc) is carried out starting from the zero point in a direction perpendicular to the contact area of the processing tool and the workpiece.

In a further advantageous modification of the method according to the invention it is provided that the thermal processing of the workpiece comprises a first thermal processing and a second thermal processing of the same workpiece which is independent of the first processing, and that method steps (a) to (b) are carried out before the first thermal processing and before the second thermal processing.

According to the invention, setting up of the processing machine takes place in a fully automated manner. This is found to be particularly advantageous if the same workpiece is to be thermally processed multiple times in succession. This is because it is thus possible to carry out the setting up of the processing machine again before each further thermal processing of the same workpiece without relatively great time delays. For example, in the case of thermal cutting, the processing machine can first be newly set up again in a fully automated manner after the cutting of a first cutting contour before a second cutting contour is cut into the same workpiece. Such a procedure additionally increases the accuracy of the second thermal processing since, when the processing machine is set up again, account can be taken, for example, of the changes in the distance sensor signal that affect the calibration by the changed workpiece geometry after the first thermal processing and other influencing parameters.

A plasma torch which has a ferromagnetic torch head and at least one ferromagnetic cutting or welding tool fixed to the torch head is preferably used as the processing tool, wherein the distance sensor comprises a field coil for generating a magnetic field and two measuring coils, wherein the measuring coils and the field coil extend around the torch head and the cutting and welding tool, wherein the distance of the plasma torch from the workpiece surface is determined on the basis of the relative position between the phases of the measurement signals recorded by the measuring coils.

The method according to the invention is suitable in particular for thermal cutting using a plasma torch.

It has been found to be particularly advantageous if a plasma torch is used as the processing tool and a capacitive sensor as the distance sensor. Capacitive sensors require only a small installation space, have good measuring accuracy and are additionally inexpensive to manufacture.

It has been found to be advantageous if, for producing the contact between the processing tool and the workpiece according to method step (aa), the processing tool is moved in the direction towards the workpiece at a speed in the range of from 0.3 m/min to 30 m/min, preferably in the range of from 3 m/min to 10 m/min.

A speed in the above-mentioned range helps to ensure that neither the processing tool nor the workpiece are damaged on production of the contact. In the simplest case, contact between the processing tool and the workpiece can be identified by the fact that an electric circuit is closed by the contact. It has proved expedient if the movement of the processing tool is stopped as soon as contact is identified.

EXEMPLARY EMBODIMENTS

Figure 2:
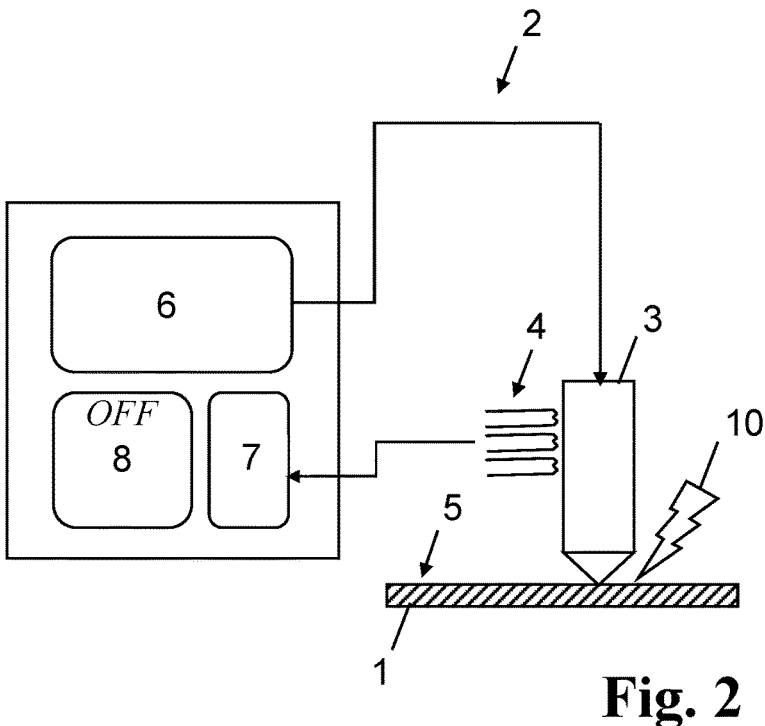
Figures 3, 4:
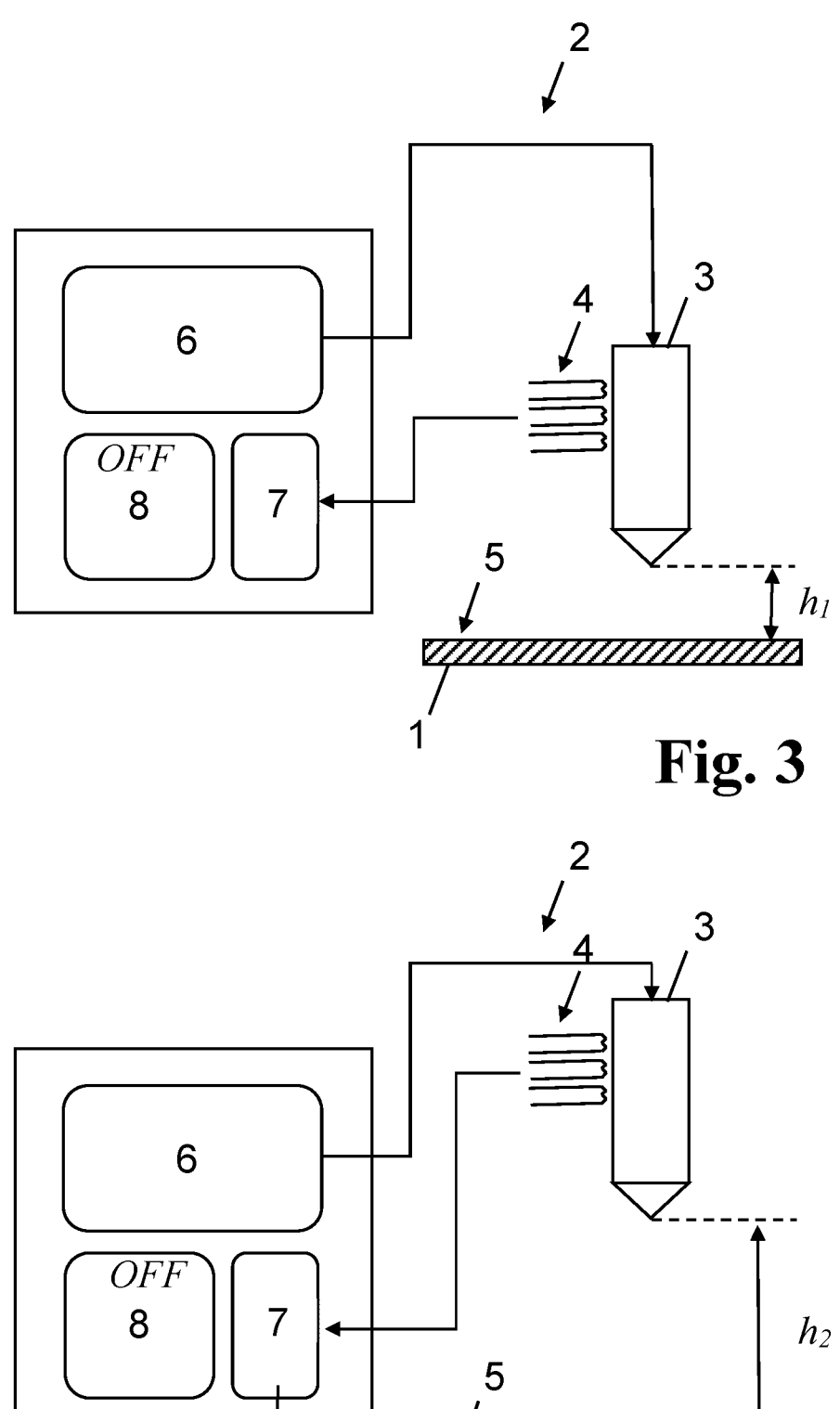
Figure 5:
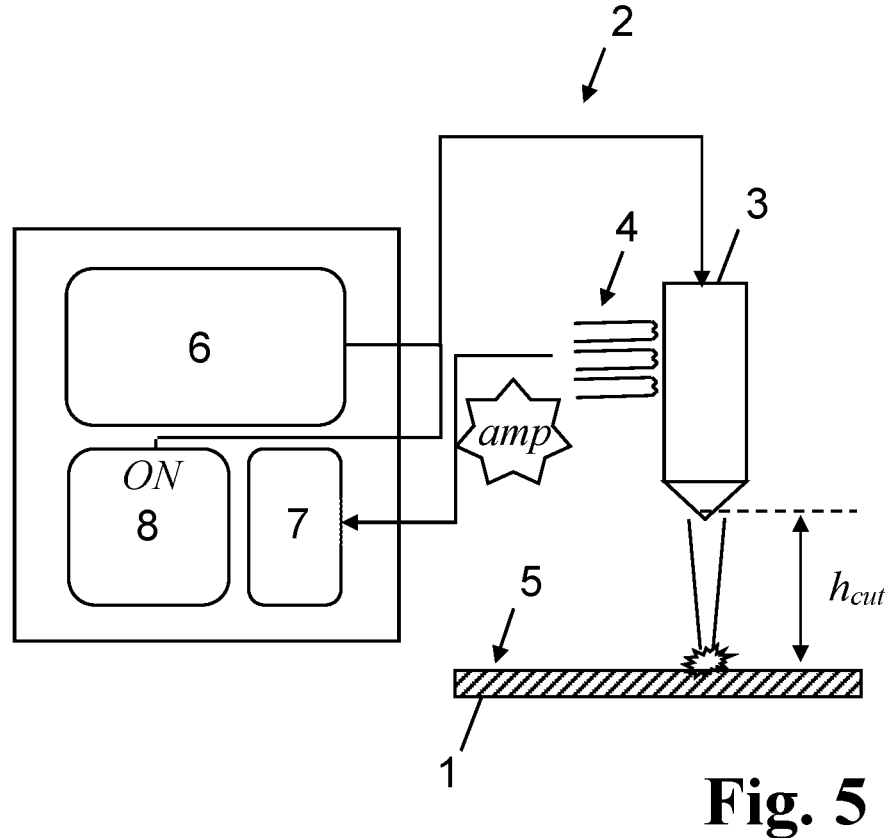

The method according to the invention is explained in greater detail hereinbelow with reference to drawings, in which, in diagrammatic form:

FIG. 1 shows a thermal processing machine having a processing tool which is moved in the direction towards the workpiece in order to produce contact with the workpiece, FIG. 2 shows the thermal processing machine from FIG. 1 at the time at which contact between the processing tool and the workpiece is produced, FIG. 3 shows the thermal processing machine from FIG. 1 during positioning of the processing tool at a first distance $h_1$ from the workpiece surface, FIG. 4 shows the thermal processing machine from FIG. 1 during positioning of the processing tool at a second distance $h_2$ from the workpiece surface, and FIG. 5 shows the thermal processing machine from FIG. 1 with the processing tool positioned at the working distance $h_{cut}$ during thermal processing of the workpiece.

FIG. 1 shows a thermal processing machine, to which reference numeral 2 is generally allocated. The thermal processing machine 2 is designed for the thermal processing of ferromagnetic workpieces. By way of example, FIG. 1 shows a workpiece 1 of structural steel S235, which has a length of 2000 mm, a width of 4000 mm and a height of 12 mm. The thermal processing machine 2 comprises a processing tool 3 in the form of a plasma cutting torch, as is described in EP 1 498 209 A2. The plasma cutting torch is provided with a distance sensor 4. The distance sensor 4 is an inductive sensor. It comprises a field coil and two measuring coils, through which the plasma cutting torch extends as the sensor body. The thermal processing machine additionally has an open-/closed-loop control unit 9. The open-/closed-loop control unit has a module 7 for recording the signal of the distance sensor 4. The processing tool is additionally displaceable in the x-, y- and z-direction relative to the workpiece via the open-/closed-loop control unit 9. In order to be able to displace the processing tool relative to the workpiece with high guiding accuracy, the open-/closed-loop control unit 9 further has a CNC controller 6 and a distance controller 8. The CNC controller 6 allows the processing tool to be positioned in the machine space as a whole. By contrast, the distance controller 8 only works reliably when the processing tool is in the vicinity of the workpiece to be processed, that is to say at a distance of not more than 200 mm from the workpiece surface 5. The CNC controller 6 therefore serves for rough positioning while the distance controller 8 serves for fine positioning of the processing tool 3 relative to the workpiece 1.

Setting Up the Processing Machine

Setting up the processing machine 2 serves on the one hand to record the spatial position of the workpiece surface 5 and on the other hand to calibrate the distance controller 8, in particular the distance sensor signal. It is carried out with the distance controller 8 switched off.

Producing a First Contact Between the Processing Tool and the Workpiece

First of all, contact between the processing tool 3 and the workpiece 1 is produced in a fully automated manner. For this purpose, the processing tool 3 is moved towards the workpiece 1 by means of the CNC controller 6 at a speed v of 5 mm/s in a direction as perpendicular as possible to the workpiece surface 5. The processing tool 3 on the one hand and the workpiece 1 on the other hand are part of an open electric circuit (not shown in FIG. 1), which is closed when the processing tool 3 touches the workpiece surface 5. Contact between the processing tool 3 and the workpiece 1 is identified by the fact that the electric circuit is closed. FIG. 2 shows the thermal processing machine 2 from FIG. 1 at the time at which contact between the processing tool 3 and the workpiece 1 is produced. The closed electric circuit used for detecting the contact is symbolised by the arrow 10.

Recording the Spatial Position of a Point on the Workpiece Surface

At the time of contact between the processing tool 3 and the workpiece 1, the position of the nozzle tip of the processing tool 3 in the space is recorded via the CNC controller 6. Since this point corresponds approximately to the spatial position of a point on the workpiece surface 5, it is set as the zero point of the processing machine coordinate system.

In addition, two further contacts between the processing tool 3 and the workpiece 1 are produced. The first contact and the two further contacts are so chosen that the contacts are at as great a distance as possible from one another. Preferably, the first contact and the two further contacts are produced at three different corners of a rectangular workpiece surface.

Determining a Safety Distance for Rapid Positioning

The safety distance for rapid positioning is calculated from the distance of the uppermost position of the z-axis from the workpiece surface minus the pierce height and minus a safety margin of about 5 mm. The pierce height is about 175% of the working distance $h_{cut}$. Within the safety distance for rapid positioning, the processing tool 3 is moved by the CNC controller 6 at a maximum speed of, depending on the z-axis, up to 30 m/min.

Positioning the Processing Tool at a First and Second Distance from the Workpiece Surface The processing tool 3—as shown diagrammatically in FIG. 3—is then displaced to a first distance $h_1$ from the workpiece surface 5. There, the signal value of the distance sensor 4 associated with the first distance $h_1$ is recorded and stored by the module 7 before the processing tool 3—as shown diagrammatically in FIG. 4—is moved to a second distance $h_2$ from the workpiece surface 5. In this case, the signal value of the distance sensor 4 associated with the second distance $h_2$ is recorded and stored by the module 7. In an alternative embodiment of the method (not shown), the first distance $h_1$ corresponds to the working distance $h_{cut}$ to be set during thermal processing of the workpiece. The associated signal value of the distance sensor 4 is used as the reference measured value for the distance controller 8.

Calibrating the Distance Controller

In a first step, module 7 calculates on the basis of the measurement points ($h_1$/signal value 1 reference value) and ($h_2$/signal value 2 reference value) a regression line and the gradient thereof (which corresponds in the case of a regression line to the height derivative f'(h) of the distance sensor signal) for calibrating the distance controller 8. Although the distance controller is thus calibrated in principle, the measurement range of the distance sensor must not be used optimally. Therefore, in a second step, the module 7 determines an amplification factor amp for the signal of the distance sensor.

Calculation of the Amplification Factor Amp is Illustrated by the Following Example:

It is assumed that the measurement signal of the distance sensor 4 increases as the distance of the distance sensor 4 from the workpiece surface 5 increases. If the distance sensor has a measurement range of +/−10 V, for example, the measurement range must be so shifted that the distance to be controlled corresponds as far as possible to a sensor signal that lies in the region of about 0 V. The gradient of the distance sensor signal is then determined on the basis of the first and second measured values. The gradient is a value for the agility of the adjustment to interfering variables, that is to say deviation of the distance. The amplification is to be so chosen that it is possible to react as quickly as possible to deviations but the controller is nevertheless quiet during normal operation.

When an amplification factor amp is used, it must, however, also be applied to the calibration. Consequently, in a third step, the amplification factor amp must also be applied to the first and second signal values, and the calibration of the distance controller 8, in particular the height derivative f'(h) of the distance sensor signal, must at least be corrected by computation. Alternatively, the processing tool 3 can, however, also be positioned at the first and second distance from the workpiece surface 5 again and the associated measured values can be recorded again with application of the amplification factor amp.

Determining a Safety Distance from the Workpiece Surface

The safety distance is calculated on the basis of the contact produced according to method step (aa) between the processing tool 3 and the workpiece 1 and a predetermined working distance $h_{cut}$ from the workpiece surface. For this purpose, a safety distance of 50 mm is applied to the recorded spatial position of the workpiece 1 and a plane parallel to the workpiece surface is calculated, which divides the processing space in which the processing tool 3 can be displaced into two sub-spaces, namely a first sub-space facing the workpiece, in which the processing tool 3 can be displaced only slowly in order to avoid collisions with the workpiece 1, and a second sub-space facing away from the workpiece, in which the processing tool 3 can be displaced with maximum speed.

Positioning the Processing Tool at the Working Distance and Thermal Processing of the Workpiece Finally, the processing tool 3—as shown diagrammatically in FIG. 5—is positioned at a predetermined working distance $h_{cut}$ relative to the workpiece surface 5 and the distance controller 8 is switched on in order to maintain the distance of the processing tool from the workpiece surface at the working distance $h_{cut}$. The signal of the distance sensor 4 multiplied by the amplification factor amp serves as the control variable for the distance controller 8. Thermal processing of the workpiece 1 is then begun.

After a first cutting contour has been cut, a second cutting contour is cut into the same workpiece. In the simplest case, it is sufficient in order to process the same workpiece multiple times to configure the processing machine a single time. The reason for this is that, after rapid positioning of the processing tool with the distance controller, an adjustment is made to a signal value which represents a distance between the processing tool and the workpiece. Alternatively, method steps (a) to (b) are repeated before the second cutting contour is cut.

The invention claimed is:

1. A method for thermal processing of a workpiece (1) with a thermal processing machine (2) which has a processing tool (3), which is displaceable relative to the workpiece (1) by a CNC controller (6) and, for fine tuning, by a distance controller (8), and a distance sensor (4) which is displaceable with the processing tool (3), wherein the following method steps are carried out in a fully automated manner:

(a) setting up the thermal processing machine (2) by (aa) moving, by the CNC controller (6), the processing tool (3) into contact with the workpiece (1) and recording, by the CNC controller (6), a spatial position of a point on a workpiece surface (5), (bb) positioning, by the CNC controller (6), the processing tool (3) at a predetermined first distance $h_1$ from the workpiece surface (5) and recording, in a module (7), an associated signal value of the distance sensor (4) as a first measured value, (cc) positioning, by the CNC controller (6), the processing tool (3) at a predetermined second distance $h_2$ from the workpiece surface (5) and recording, in the module (7), an associated signal value of the distance sensor (4) as a second measured value, (dd) calibrating the distance controller (8), which comprises determining, by the module (7), a height derivative of a signal of the distance sensor and an amplification factor amp for the signal of the distance sensor (4) taking into account the first measured value, the second measured value, the first distance $h_1$ and the second distance $h_2$, (b) positioning the processing tool (3) at a predetermined working distance $h_{cut}$ from the workpiece surface (5), and (c) thermally processing the workpiece (1) by the processing tool (3) while the distance controller maintains a distance of the processing tool (3) from the workpiece surface (5) at the working distance $h_{cut}$ using the signal of the distance sensor (4) amplified by the amplification factor amp as a control variable.

2. The method according to claim 1, wherein setting up the thermal processing machine (2) according to method step (a) comprises positioning the processing tool (3), by the CNC controller, at the working distance $h_{cut}$ from the workpiece surface (5) and recording, by the module (7), the associated signal value of the distance sensor (4) as a reference measured value for the distance controller (8).

3. The method according to claim 1, wherein the signal value recorded on production of the contact between the processing tool (3) and the workpiece (1) according to method step (aa) is a reference value which is taken into account in the calibration of the distance controller (8).

4. The method according to claim 3, wherein the reference value is taken into account in the calibration of the distance controller (8) in the determination of the amplification factor amp, according to method step (dd).

5. The method according to claim 1, wherein on the basis of the contact between the processing tool (3) and the workpiece (1) produced according to method step (aa) and on the basis of the predetermined working distance $h_{cut}$ from the workpiece surface (5), a safety distance from the workpiece surface (5) for rapid positioning of the processing tool (3) is determined.

6. The method according to claim 1, wherein for recording the spatial position of the workpiece surface (5) according to method step (aa), a second contact between the processing tool (3) and the workpiece (1) is produced and the spatial position of a second point on the workpiece surface (5) is recorded.

7. The method according to claim 1, wherein for recording the spatial position of the workpiece surface (5) according to method step (aa), two further contacts between the processing tool (3) and the workpiece (1) are produced at points on the workpiece surface (5) which are spaced apart from one another.

8. The method according to claim 1, wherein the distance sensor records the electrical capacitance between a measuring electrode of the distance sensor (4) and the workpiece (1).

9. The method according to claim 1, wherein the distance sensor (4) records the distance between the workpiece (1) and the processing tool (3) by an optical method.

10. The method according to claim 1, wherein the contact between the processing tool (3) and the workpiece (1) is identified by the feedback of a drive amplifier or by a mechanical lever on-off switch.

11. The method according to claim 1, wherein the contact between the processing tool (3) and the workpiece (1) is identified with the aid of the sensor signal and a default parameterisation of a closed-loop control circuit for setting the working distance.

12. The method according to claim 1, wherein the positioning of the processing tool (3) according to method step (bb) and/or (cc) is carried out on the basis of a processing machine coordinate system, a zero point of which is a contact point produced on production of the contact between the processing tool (3) and the workpiece (1) according to method step (aa).

13. The method according to claim 1, wherein the thermal processing of the workpiece (1) comprises a first thermal processing and a second thermal processing, independent of the first thermal processing, of the same workpiece (1), and in that method steps (a) and (b) are carried out before the first thermal processing and before the second thermal processing.

14. The method according to claim 1, wherein there is used as the processing tool (3) a plasma torch which has a ferromagnetic torch head and at least one ferromagnetic cutting or welding tool fixed to the torch head, and in that the distance sensor (4) comprises a field coil for generating a magnetic field and two measuring coils, wherein the measuring coils and the field coil extend around the torch head and the cutting and welding tool, and in that the distance of the plasma torch from the workpiece surface (5) is determined on the basis of the relative position between the phases of the measurement signals recorded by the measuring coils.

15. The method according to claim 1, wherein the processing tool (3) is a plasma torch and the distance sensor (4) is a capacitive sensor or an optical sensor or an inductive sensor.

16. The method according to claim 1, wherein the processing tool (3) is a laser cutting head and the distance sensor (4) is a capacitive sensor or an optical sensor or an inductive sensor.

17. The method according to claim 1 wherein, for producing the contact between the processing tool (3) and the workpiece (1) according to method step (aa), the CNC controller (6) moves the processing tool (3) in the direction towards the workpiece (1) at a speed v in the range of from 0.3 m/min to 30 m/min.

* * * * *